G. VALIANT.

BOOT.

No. 10,669. Reissued Dec. 1, 1885.

WITNESSES

Chas. T. Robertson.

E. H. Bond.

INVENTOR

George Valiant

By Donald C. Ridout & Co.

Attorneys.

N. PETERS, Photo-Lithographer, Washington, D. C.

UNITED STATES PATENT OFFICE.

GEORGE VALIANT, OF TORONTO, ONTARIO, CANADA.

BOOT.

SPECIFICATION forming part of Reissued Letters Patent No. 10,669, dated December 1, 1885.

Original No. 298,638, dated May 13, 1884. Application for reissue filed December 18, 1884. Serial No. 150,686. Patented in Canada October 16, 1883, No. 17,896.

*To all whom it may concern:*

Be it known that I, GEORGE VALIANT, of the city of Toronto, in the county of York, in the Province of Ontario, Canada, have invented certain new and useful Improvements in Boots; and I do hereby declare that the following is a full, clear, and exact description of the same.

The object of the invention is to make a button-boot in which it will not be necessary to stitch around the button-holes, and in which the button-holes, when worn, may readily be replaced without in any way injuring or disfiguring the upper of the boot; and it consists in stamping the button-holes out of a piece of rawhide or other suitable material, and stitching the piece thus prepared onto the fly or flap of the upper, as hereinafter explained.

Figure 1:
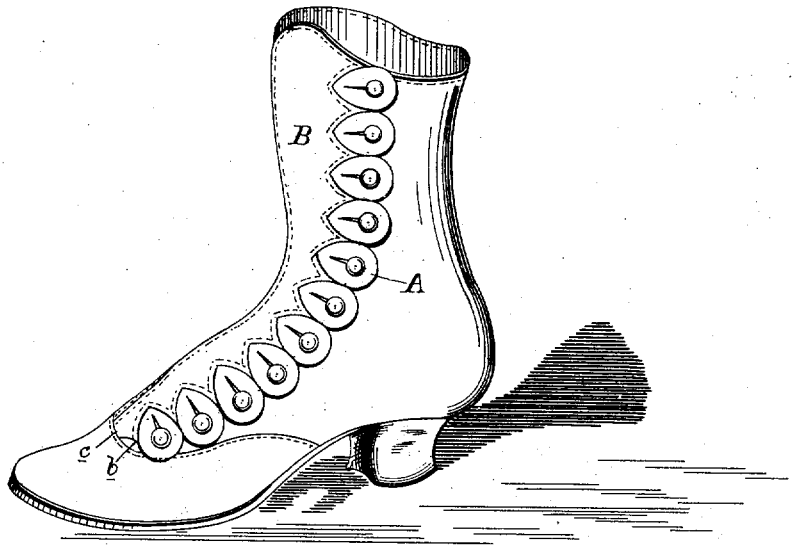
Figure 2:
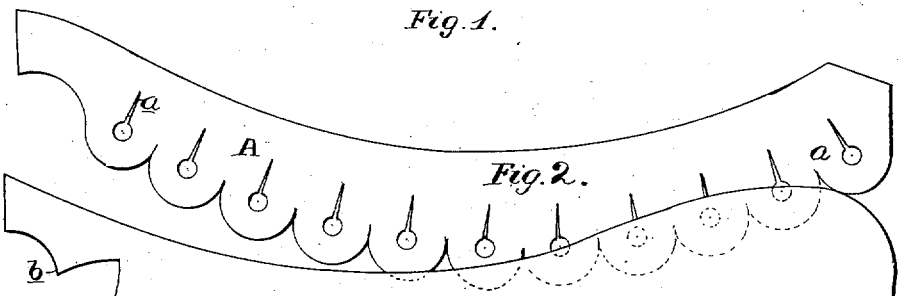
Figure 3:
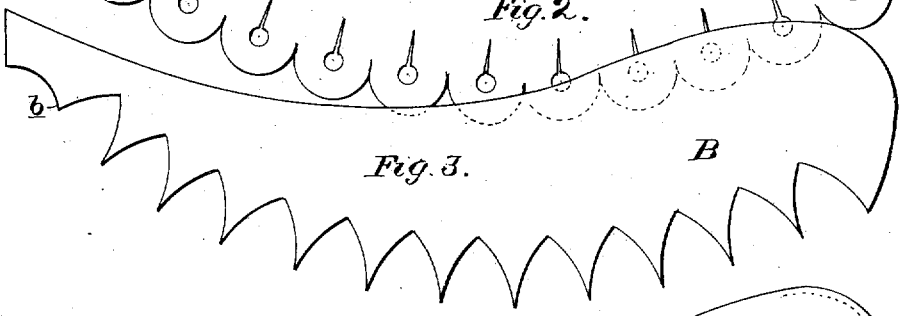
Figure 4:
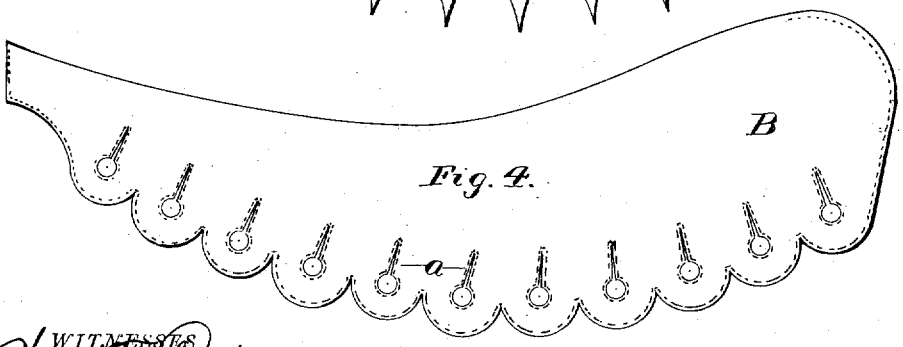

Figure 1 shows a boot having my improved button-hole strip sewed to one side of the fly or flap of the upper, the connecting edge of the fly or flap being cut away and serrated or scalloped. Fig. 2 is a plan of my improved button-hole strip detached. Fig. 3 shows a plan of that portion of the flap to which my button-hole piece is to be attached, and which is shown as provided with a serrated or scalloped edge. Fig. 4 is a plan of an ordinary fly or flap detached, provided with the usual stitched button-holes.

In button-boots as now ordinarily made the button-holes are stamped out near the edge of the fly or flap of the upper, and the edges of each button-hole are protected or strengthened, either by stitching or by a separate patch cemented or stitched in position over or around the edges of each button-hole. Button-holes, it is well known, soon wear out, and then cannot be neatly repaired. It is, moreover, an expensive matter to stitch or patch each button-hole.

I am aware of Patent No. 172,957, in which, although it is not suggested that button-holes may be made as mine are, it is incidentally suggested that the entire fly or flap of the boot in which the button-holes are made may be made of strong material; but this would be objectionable, because requiring too much thick leather if the button-holes were to be made in it like mine, and I therefore deem my invention a material improvement upon and wish to clearly distinguish it from this plan. I am also aware of Patent No. 186,526, in which it is proposed to strengthen the button-holes by separate re-enforcing patches of leather secured to the outside of each button-hole; but in no case, as far as I am aware, is there shown a boot having a portion of its fly or flap cut away to allow a button-hole strip made of stronger material to be sewed to its edge, or in which the said strip is made of material of a single thickness, and yet sufficiently heavy to permit serviceable button-holes to be made in it without the necessity of stitching each hole or otherwise strengthening it by adding an additional thickness of other material. I am also aware that it is not broadly new to make a button-hole in thick leather by simply cutting or punching it out without stitching.

In the drawings, A is a button-hole piece, preferably made of rawhide or other strong material, and having a series of button-holes, *a*, made in it, as shown. This piece A is sewed to the flap B of the upper.

In order to make the connection between the button-hole strip A and fly or flap B as neat as possible, I scallop or serrate the edge of the fly or flap, as shown in Fig. 3, and fasten the button-hole piece to it by a line of stitches along the line of union, extending from the top of the fly to the point *b*. (Shown in Fig. 1.)

In order to secure a neat and strong finish and to facilitate repairing, I cut the fly B with a lip or point, *b*, (or what I might call a "half-point,") near its lower end, as shown in Figs. 1 and 3. By this means a symmetrical finish is given to the edge of the completed fly, composed of the united parts A and B, as shown in Fig. 1, and a neat and uniform appearance of the stitching fastening them together in scalloped lines is also secured. By bringing the stitching out at the end of the point *b* the lower end of the sewing which joins the two parts is the same, not only in appearance but in strength and security, as the upper end, (see Fig. 1,) because the strain is substantially in the direction of the line of the seam at both ends, which prevents ripping. Furthermore, by this plan the entire stitching of the strip to the edge of the fly can be done by a machine with great facility. The stitching, being brought out to the edge of the completed fly at the end of the point *b*, allows of all of the sewing necessary to attach a strip, A, being done without disturbing the fly below at the line or seam *c*, where it joins the front upper-leather of the shoe. This is important in case of removing a strip, A, when worn to replace it by a new one, because by means of point *b* it can be done without disturbing or disfiguring the fly B or the seams which secure it to the upper-leather, in case it is of a separate piece sewed on, and then the same smooth and symmetrical appearance of both the edge and the stitching can be secured in repairing, as in new work, and also the same strength and security. I therefore deem it as important to provide the lip or half-point *b* as to provide the serrations upon the edge of the fly, and both these features are useful parts of my invention.

While my invention is specially designed for button-boots, it may also be applied to lace-boots, instead of button-holes eyelets being substituted.

I deem it important that the edges of the flap of the upper be serrated, as shown, because by this arrangement not only is a very neat finish formed, but the stitches that secure the pieces A to the flap of the upper, following the form of the scalloped edge, render the shoe at this place much stronger, and the piece A less liable to be torn off, than where there is a straight seam.

What I claim as my invention is—

1. A boot having its fly or flap B partly cut away, substantially as set forth, and provided with a narrow button-hole strip of stronger material firmly attached thereto, substantially as described.

2. A boot having the edge of its fly or flap cut so as to receive a button-hole strip and to leave a point or lip, *b*, in combination with the button-hole strip A, made of a single thickness of stronger material, substantially as described.

3. A boot having the edge of the fly or flap of its upper serrated or scalloped, in combination with a piece of material sewed to the said edge, and having eyelets or button-holes stamped out of it, substantially as and for the purpose specified.

Toronto, December 4, 1884.

GEORGE VALIANT.

In presence of—

JOHN LEYS,
*A Notary Public for Canada.*
CHARLES C. BALDWIN.